April 26, 1955 M. T. LUDWIGSON ET AL 2,707,112
PEDAL OPERATED SCOOTER
Filed Sept. 27, 1950 5 Sheets-Sheet 1
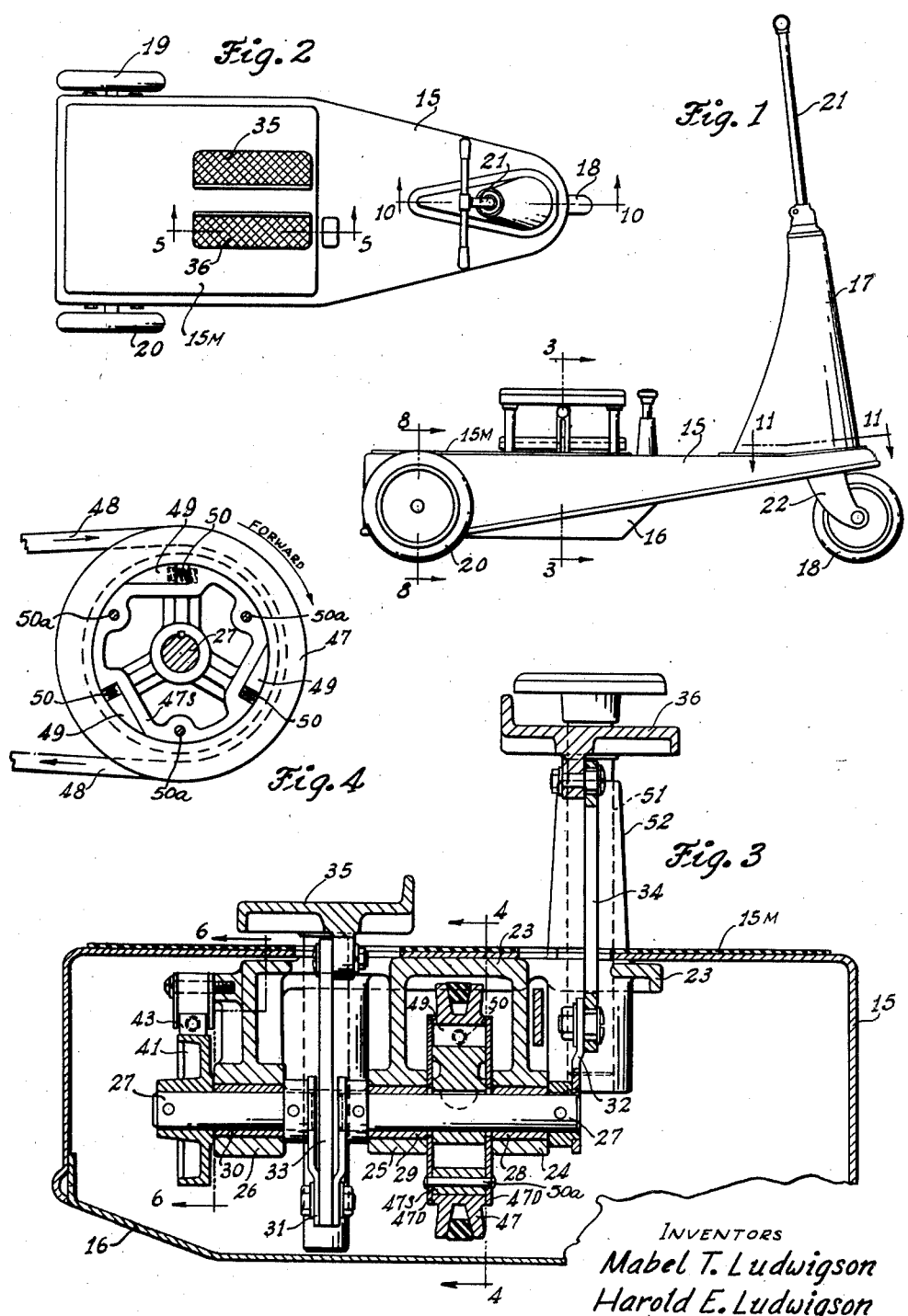
INVENTORS
Mabel T. Ludwigson
Harold E. Ludwigson
By Charles R. Woodin
AGENT

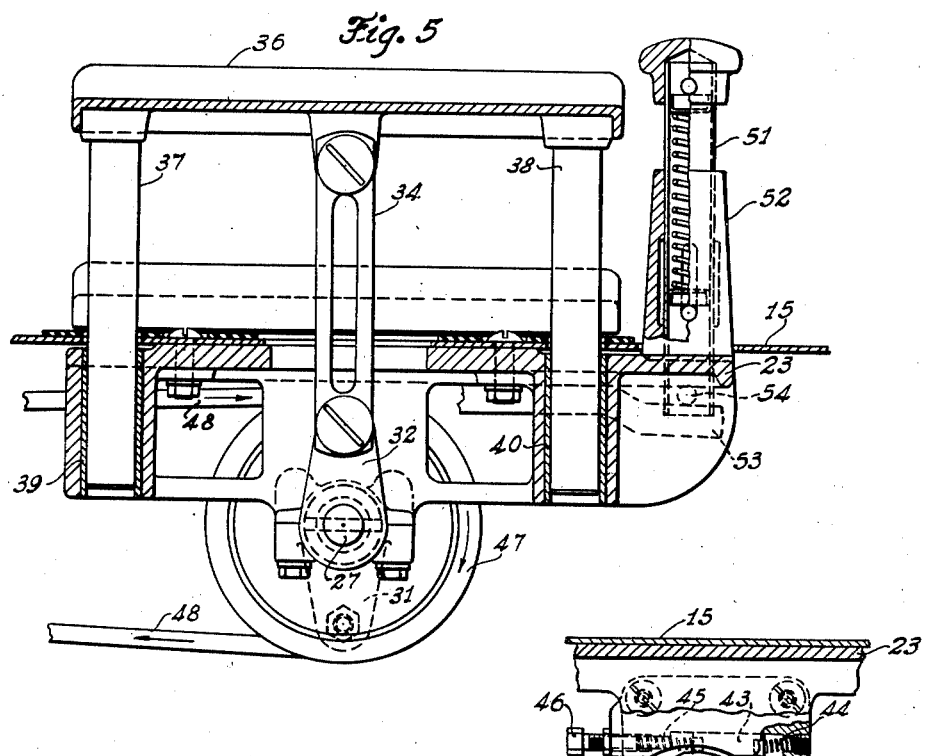

April 26, 1955 M. T. LUDWIGSON ET AL 2,707,112
PEDAL OPERATED SCOOTER
Filed Sept. 27, 1950 5 Sheets-Sheet 3
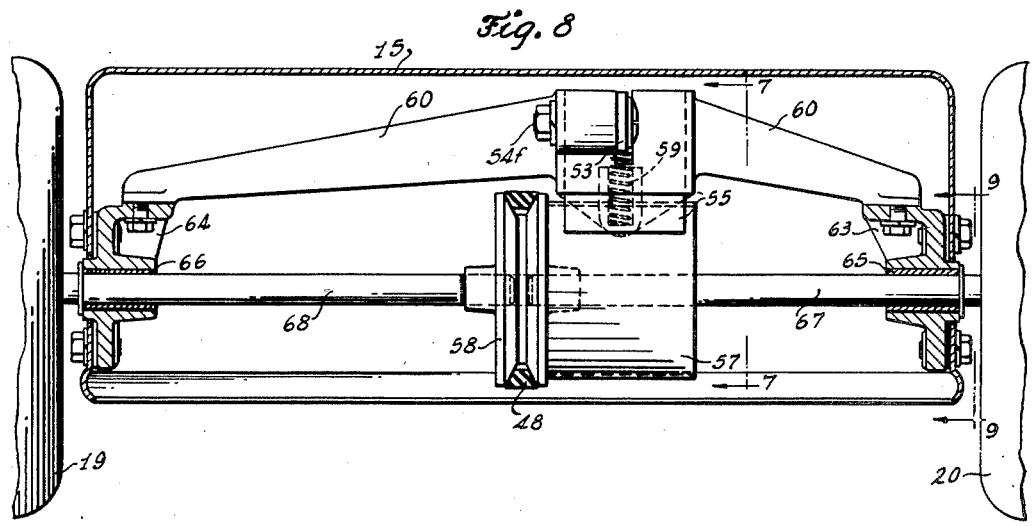
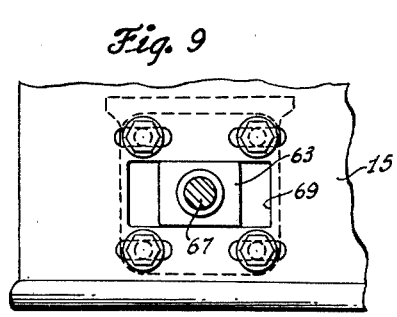
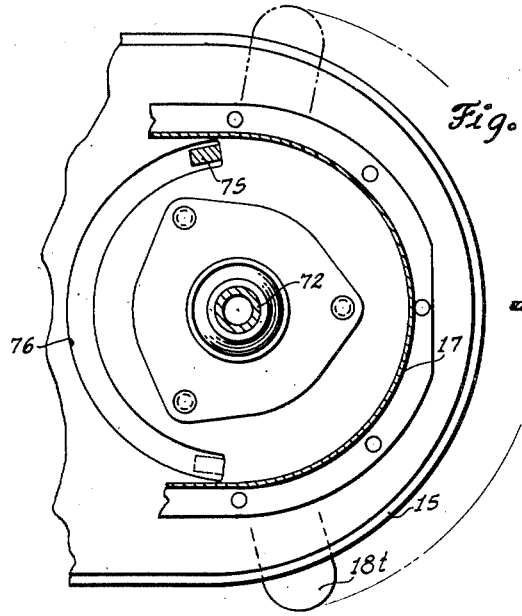
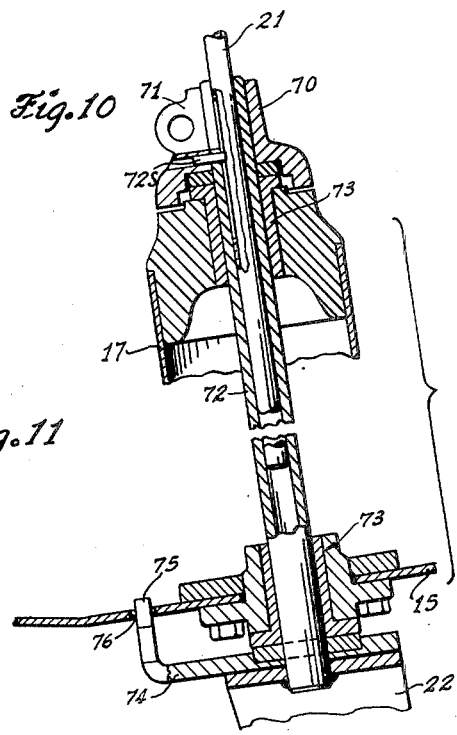
INVENTORS
Mabel T. Ludwigson
Harold E. Ludwigson
By Charles Kubodin
AGENT

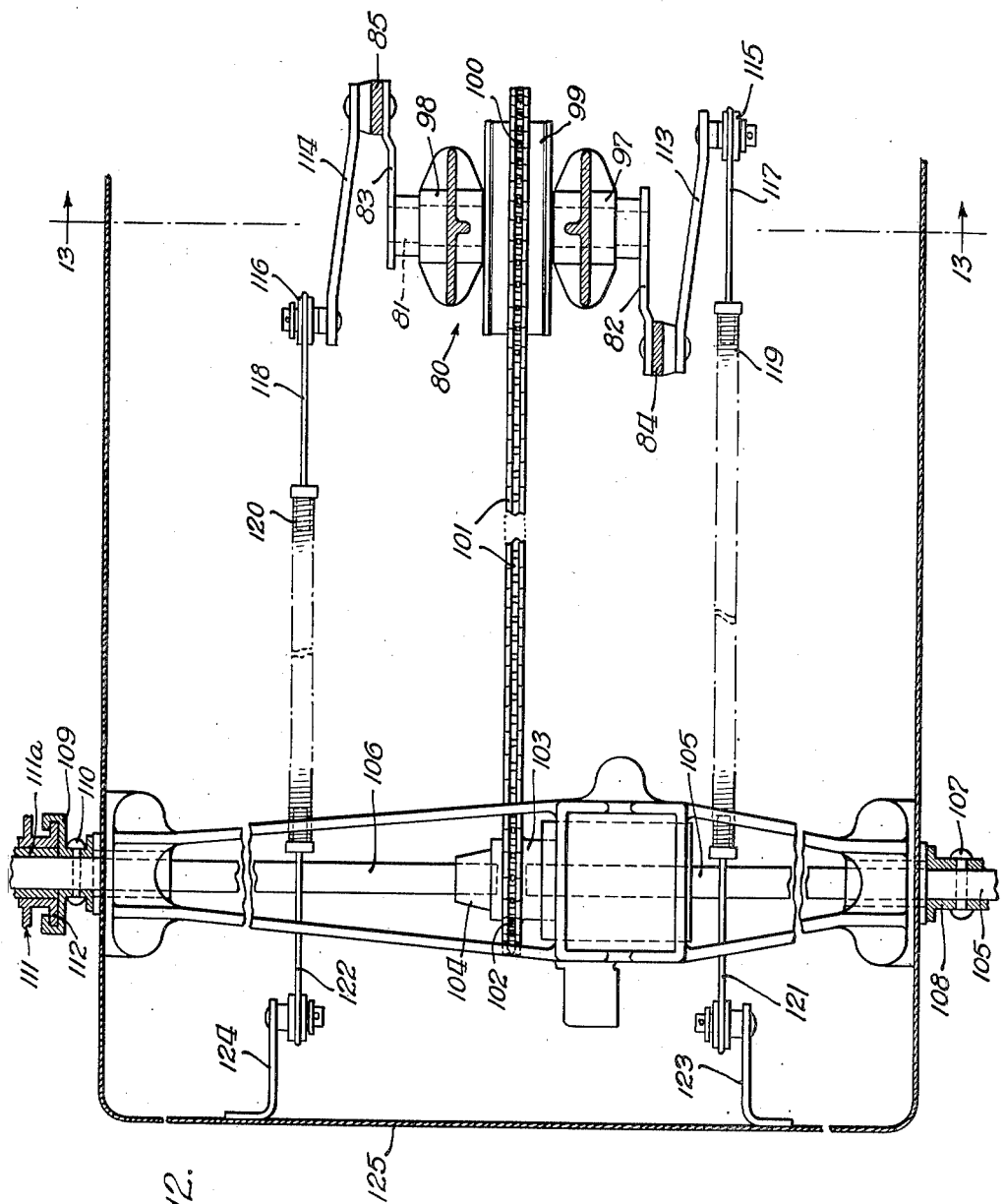

April 26, 1955   M. T. LUDWIGSON ET AL   2,707,112
PEDAL OPERATED SCOOTER
Filed Sept. 27, 1950   5 Sheets-Sheet 5
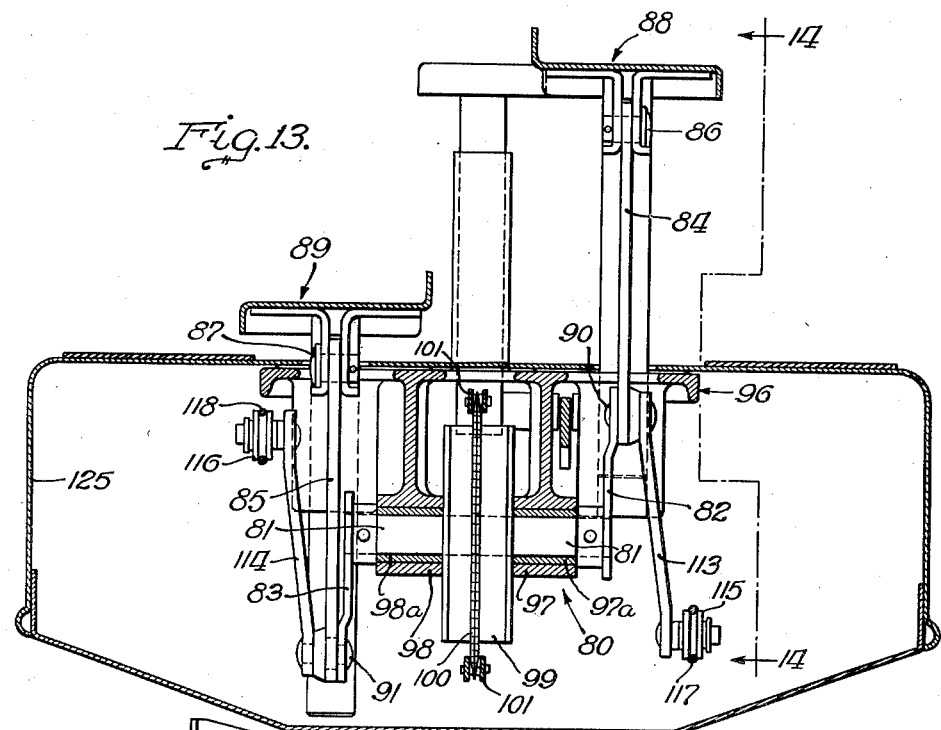
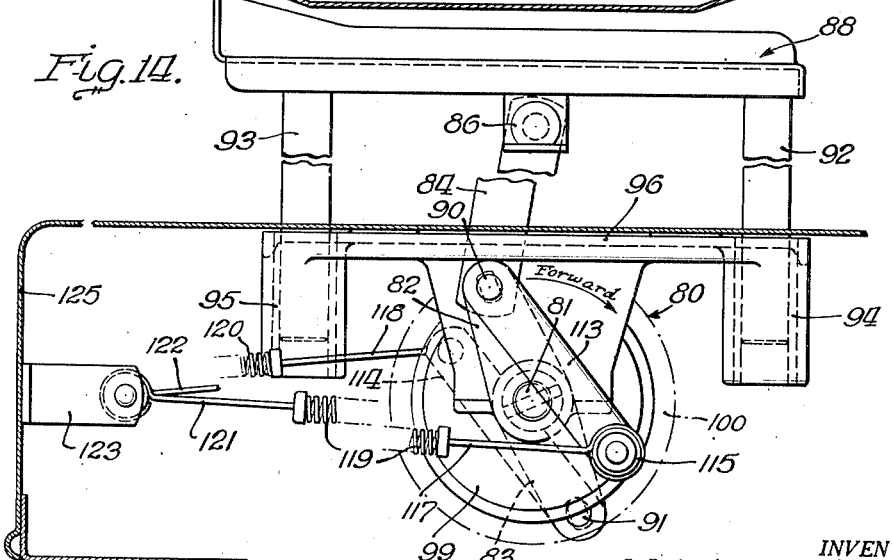
INVENTORS:
Mabel T. Ludwigson
Harold E. Ludwigson
By: Eberhard E. Wettley
Atty.

United States Patent Office 2,707,112
Patented Apr. 26, 1955

2,707,112

PEDAL OPERATED SCOOTER

Mabel T. Ludwigson and Harold E. Ludwigson, Chicago, Ill.

Application September 27, 1950, Serial No. 186,988

4 Claims. (Cl. 280—221)

This invention relates to a manual foot-pedal wheeled vehicle of the type commonly known as scooters. However, it varies from the conventional scooter in that whereas the ordinary scooter depends on the manual effort of the operator to create, by running and pushing, sufficient velocity aided by foot power applied to the ground to keep the scooter in operation, the present device, although it may originally take on some of the aspects of the conventional scooter, depends on mechanical means driven through pedals to keep the wheeled vehicle in operation.

This invention comprises a continuation-in-part of our copending application, Serial No. 779,196, filed October 10, 1947, now abandoned.

There have been many attempts in the past to supply wheeled vehicles having mechanical means to create motion. Unlike the bicycle, which is one of this type of vehicle, the scooter type depends upon a vehicle wherein the operator stands on a low platform supported on the wheels and creates the forward motion by foot movements either on the ground or on mechanism devised for a similar purpose. In this type of vehicle, the operator normally remains in a standing position while propelling the device, but a seat may be provided thereon for use by the operator if desirable.

The particular object of the present invention is to provide a scooter type wheeled vehicle promoting healthful exercise and enjoyment, having pedal means for driving the vehicle forwardly while the operator actuates the pedals and guides the vehicle while being supported by handle bars disposed thereon.

Another object of the present invention is to provide a wheeled vehicle of the scooter type having a platform in the rear to support an additional rider, the additional platform not being interfered with by the pedals.

Another object of the present invention is to provide a wheeled vehicle of the scooter type wherein the pedal driving means is operated in a vertical up and down reciprocating manner in order that the physical effort of the operator be exerted without excessive ankle action which is normally exhausting, the desired effort being almost entirely in knee action which employs large leg muscles and less exhausting action on the part of the operator.

A further object of the present invention is to provide a wheeled vehicle of the pedal operated type wherein the mechanism of the vehicle is divided into separable bench assembly units that can be economically and effectively assembled as a complete unit on the vehicle frame with a minimum of interdependent relationships between the units and a minimum of interrelated dimensional tolerances.

A further object is to provide a wheeled vehicle of the pedal driven variety, obtaining forward motion by using a friction type overrunning clutch, which has a quite action, thus eliminating the customary ratchet type overrunning clutch which is very noisy in action.

A further object is to provide a wheeled vehicle of the pedal driven variety providing a forward driving action and when desired speed is obtained the operator may cease pedaling and coast without removing his feet from the pedals. The operator can obtain the driving action anytime during the coasting cycle by resuming action of the pedals.

A further object is to provide a wheeled vehicle of pedal driven variety wherein the forward motion of the vehicle is not only controlled by the pedal mechanism but by an interrelated brake mechanism in easy access to the operator so that the vehicle may be operated with a minimum of danger to both the operator and/or the extra rider.

A still further object is to provide a wheeled vehicle of the pedal driven variety designed to provide sensible speed through the use of proper ratio pulleys or sprockets, ease and quietness of operation and having a low center of gravity to prevent tipping or overturning while in operation.

A further object of this invention contemplates the use of a self-energizing mechanism associated with the pedal driven mechanism which will function to carry the connecting rods of the pedals and the pedals over-center when the operator is manipulating such pedals.

Some of the other interrelated objects and advantages of the present invention may be summarized as constituting the provision of a three wheeled vehicle having four major assemblies each adapted for low cost production line fabrication; the provision of such four major assemblies requiring no interrelated dimensional tolerances; the provision of a scooter type of vehicle with the rear platform for an additional rider; the incorporation of a reciprocating pedal action for driving the vehicle to eliminate tiresome ankle action which also includes the use of a low platform to aid the stance of the operator through a comfortable and effective posture while operating such pedal type unit; the provision of a scooter type vehicle that is forwardly operated including a free wheeling action and a brake to stop the vehicle, the provision of a vehicle of this type with a reverse lock whereby only forward motion is transmitted to the vehicle wheels; and finally to provide a vehicle of this type having a free wheeling clutch operatively connected with a mechanism including self-energizing spring means as an aid to the operator in propelling the vehicle.

Other objects and benefits will be disclosed in the following descriptions and drawings in which:

Fig. 1 is a side elevation view of our wheeled pedal operated vehicle of the scooter type which we designate as a "Pedal Pacer" because of its up and down reciprocating pedal action;

Fig. 2 is a top plan view of the vehicle shown in Fig 1;

Fig. 3 is an enlarged cross sectional view of the pedal driving mechanism as it would appear on the section line 3—3 of Fig. 1;

Fig. 4 is an enlarged side elevation view of the unidirectional belt driving mechanism as it would appear on the section line 4—4 of Fig. 3;

Fig. 5 is an enlarged sectional view of the pedal driving mechanism and brake pedal as it would appear on the section line 5—5 of Fig. 2;

Fig. 6 is an enlarged side elevational view of the unidirectional control mechanism for the pedal driving means as it would appear on the section line 6—6 of Fig. 3;

Fig. 7 is an enlarged cross sectional view of the driven pulley and brake mechanism in the rear axle assembly as it would appear on the section line 7—7 of Fig. 8;

Fig. 8 is an enlarged cross sectional view of the rear axle mechanism as it would appear on the section line 8—8 of Fig. 1;

Fig. 9 is an enlarged broken side elevational view of the rear axle adjustment and mounting mechanism as it would appear on the section line 9—9 of Fig. 8;

Fig. 10 is a broken enlarged side cross sectional view of the adjustable steering column mechanism as it would appear on the section line 10—10 of Fig. 2;

Fig. 11 is an enlarged horizontal cross sectional view of the steering column limiting mechanism as it would appear on the section line 11—11 of Fig. 1;

Fig. 12 is a fragmentary plan sectional view of a modified arrangement illustrating the self-energizing spring means interposed as an aid to the operation of the vehicle with the spring arms shown in horizontal position;

Fig. 13 is a vertical cross sectional view taken substantially along the plane of the line 13—13 in Fig. 12 but with spring arms disposed in vertical position; and Fig. 14 is a detail sectional view taken substantially as viewed along the line 14—14 in Fig. 13 to illustrate the relationships of the crank parts and the spring arms of the modified construction as they appear in their operative position.

Referring now to the drawings, and at the outset to Figs. 1, 2 and 3, we show a main frame member 15 having a bottom closure member 16 for enclosing mechanism between the two frames. On the top rear of the frame member 15 there is mounted an anti-skid mat or surface 15M which may be separable or integral with the frame 15. This anti-skid mat or surface prevents accidental slippage by both operator and rider and thus reduces accident hazards. On the front of the main frame member is mounted a steering column member 17. The frame is supported by 3 wheel members 18, 19 and 20 as shown. In the steering column is mounted an adjustable handle bar steering member 21 from which the operator supports himself as he rides upright on the device. The steering member 21 actuates a caster bracket 22 supporting the front wheel member 18.

Now referring to Fig. 3, it will be observed that the operating mechanism is supported in a cast frame member 23 carrying crank shaft support hubs 24, 25, and 26 supporting a crank shaft 27 which is rotatably mounted in oilless type metal bearings 28, 29 and 30 as shown. Our design contemplates the use of such oilless bearings wherever indicated in the operating mechanism in order that it may be used for a considerable period of time without the necessity of re-oiling as would be necessary with ordinary bearings. Under these conditions, it is feasible to enclose the mechanism between the frame members 15 and 16 as shown, in order to retain the bearings in a clean lubricated condition for an extensive period of time. Hereinafter where inserted sleeve type bearings are shown, it will be understood that oilless bearings are intended.

Attached to the crank shaft 27 in a conventional manner are two similar coacting 180° crank mechanisms 31 and 32 pivotally connected to pedals 35 and 36 by connecting rods 33 and 34 respectively. As well shown in parts 32 and 34, the pivotal connecting bearings (of the oilless type) effectively reduce the friction of the parts.

Now referring to Fig. 5, it is explained that the pedal 36 is guided in a vertical reciprocating manner by two guide tubes 37 and 38 supported in oilless bearings 39 and 40 as shown. It will be understood without further explanation that the companion pedal 35 is guided in the vertical reciprocating manner by similar mechanism as that above described for pedal 36.

From the foregoing it will be appreciated that the operator may actuate the pedals 35 and 36 by a powerful thigh, leg and knee action with a minimum of ankle action while he is supported by the adjustable handle bar 21 in an effective comfortable position. Further that this manual effort is transmitted to the crank shaft 27 with a minimum of frictional loss.

Now referring to Fig. 6, we will explain how we control the unidirectional forward rotation of the crank shaft 27. Fixed on the left end of the crank shaft 27 as shown in Fig. 3 is a cam wheel 41 having cam-like protrusions 41a and 41b. When the cam wheel is rotated to drive the vehicle forwardly as indicated by the arrow marked "Forward," a cam lock member 43 adjustably spring mounted by springs 44 and 45 and adjustment bolt 46 permits the cam wheel to rotate in the forward direction with a minimum of interference. This is due to the fact that the spring 44 will yield and allow the cam portions 41a and 41b to move and pass the lock cam 43. However, when the operator through pedals 35 and 36 actuates the crank shaft 27 in reverse direction, the spring 44 will have shifted the lock cam 43 to the left against the weaker tension of spring 45 so that when a cam portion 41a or 41b engages the cam lock 43, the latter will not shift to the left with the result that a locking action will occur between the disk 41 and the cam lock that will prevent reverse rotation. It will be noted that the left hand end of the cam lock 43 does not have a curved shoulder like the right hand end so that reverse rotation of wheel 41 cannot shift the cam lock to the left; instead it will exert an upward pressure and become locked.

Now referring to Figs. 4 and 7, we show a belt drive pulley 47 and a belt 48 and driven pulley 58. Although we desire to use a V-belt drive construction and rely on the advancing technology of V-belt engineering, we desire to explain that we may, after field test, return to some other type of drive mechanism involving similar operating mechanism such as the many types of positive chain drives now available on the market. The drive member (pulley or sprocket) 47 has inserted into its inside rim three tapered friction drive wedges 49 which are preloaded with compression springs 50. These drive wedges are nested in a central spider 47s which is keyed to crank shaft 27. These wedges 49 are retained in the central spider 47s by side discs 47d as shown in Fig. 3 secured with pins 50a as shown. The drive member 47 (pulley or sprocket) is likewise retained by discs 47d. It is understood that by this construction, forward rotation of the crank shaft 27 will drive pulley or sprocket 47 in a forward direction by quiet friction drive means upon application of the foot pedals, but the operator may at any time stop the pedal action and obtain a coasting action from the inertia developed in the vehicle, thus releasing the wedges 49 in the unidirectional drive mechanism.

The free coasting action of our wheeled vehicle indicates the desirability of a brake and we now provide such a brake by mounting a conventional type of spring retained actuating plunger 51 in a boss 52 attached to the cast frame member 23 as clearly shown in Fig. 5. The plunger 51 contacts a brake lever 53 by means of a cross pin 54 in the spring supported plunger 51 and the brake lever 53 pivoting on the bolt 54f (see Fig. 7) actuates a brake shoe 55 through a cross pin 56 into braking contact with a brake drum 57 mounted on the driven pulley 58 as clearly shown in Fig. 8. The entire brake mechanism is supported from gravity contact with the brake drum 57 by a compression spring 59 urging the brake lever 53 upwardly as clearly shown in Fig. 7.

Now referring to Figs. 7, 8 and 9, we will describe our rear axle sub-assembly. This structure comprises one casting 60 which provides a proper supportng cavity for the brake shoe 55 and the brake clearance spring 59 and supports the brake lever 53 previously described. On the outer ends of the brake casting 60 are mounted bearing support brackets 63 and 64 with inserted oilless bearings 65 and 66 for rotatably supporting the rear wheels 19 and 20. It will be noted that the axles 67 and 68 have a fixed splined connection to the driven pulley 58 and brake drum 57, but it is pointed out that should it be desirable to provide a differential action, suitable space is provided. It will be noted that elongated perforated openings 69 are provided in the side walls of the frame 15 to adjustably support the bearing brackets 63 and 64 by means of clamp bolts as shown.

It will, therefore, be appreciated that the entire rear axle assembly may be readily mounted in the frame 15 and adjusted to provide proper tension on the belt 48.

The brake casting 60 has two functions: first as a brake housing; second to keep bearing support brackets 63 and 64 in perfect alignment for the rear axles 67 and 68. It will further be noted that parts 60, 63 and 64 being assembled to form a unit, will remain in a fixed position, thus brake shoe 55 and brake drum 57 are in a fixed relation to each other regardless of what adjustments may be made on the belt or chain.

Now referring to Fig. 10, we will explain the steering mechanism. On the steering column 17 is mounted a rotatable clamp casting 70 having a conventional split clamping device on its top for secure bolt clamping action through the ears 71 as shown. A hollow steering column 72 slidably supports the splined handle bar shaft 21 by a conventional spline device 72s shown directly under the clamp ears 71 as a pin and slot. By this construction it will be understood that we have provided an adjustable handle bar shaft whereby the handle bars may be adjusted to the most effective and convenient height for the operator. This is very important in order to position the operator with relation to the actuating pedals so that a minimum of effort is required, particularly as to ankle action.

The steering column 72 is rotatably mounted in support bearings generally described as element 73. The steering column attaches to the caster bracket 22 carrying the front wheel 18 in the conventional and expected bearing supported manner as will be clearly understood by reference to Fig. 10. However, on top of the caster bracket 22 there is welded a steering control stop member 74 having an upturned stop member 75 extending through a circular slot 76 in the frame 15. The slot 76 cooperating with the stop member 75 effectively limits the movement of the caster wheel 18 within safe limits. The projection 18t of the wheel 18 extends beyond the frame 15 and gives the operator visual indication of the caster wheel position.

Referring now to Figs. 12 to 14 inclusive, the modified construction utilizes a symmetrical drive crank construction indicated generally at 80, using a crank shaft 81 having crank arms 82 and 83 connected with the connecting rods 84 and 85, which rods are pivotally connected at 86 and 87 to the pedals 88 and 89. The lower ends of the connecting rods 84 and 85 are also pivotally connected at 90 and 91 to the crank arms 82 and 83. Each of the operating pedals is guided for vertical operation by means of the guide tubes 92 and 93 operating in oilless bearings 94 and 95 mounted in the main casting 96 in the same manner as in the construction previously described in connection with Figs. 1 to 11. Casting 96 also provides crank shaft support hubs 97 and 98 supporting crank shaft 81 which is rotatably mounted in oilless type metal bearings 97a and 98a.

Vertical manipulation of the foot pedals 88 and 89 to their limits of operation will move the crank arms 82 and 83 to rotate the crank shaft 81 and the drive of crank shaft 81 is transmitted through the overrunning clutch 99 to drive the sprocket 100, thus driving the chain 101 which connects with a sprocket 102 as best shown in Fig. 12. A driven sprocket 102 is connected by means of hubs 103 and 104 to the axles 105 and 106. They are splined to the hubs for rotation directly with the sprocket 102.

In this construction, the drive is only transmitted to one of the wheels, and as shown in Fig. 12, axle 105 is pinned at 107 to a hub 108 of the drive wheel located to this side of the vehicle. The opposite axle 106 is secured to a retaining spacer 109 by a pin 110 and the hub 111 of the wheel at this side of the vehicle is flanged as at 112 for free rotation within the retaining spacer 109. Mounted in wheel hub 111 is oilless bearing 111a which rotates freely on axle 106. Thus, with this construction, only one wheel is driven while the other is free to rotate to obtain a differential action when negotiating curves with the vehicle to eliminate skidding of either wheel during this operation. Furthermore, by driving both axles 105 and 106 and by using the particular structures described in connection with the wheels, it is possible to use these wheel connecting parts interchangeably at either side of the vehicle.

Referring back to the crank mechanism 80, it should be noted that this unit is arranged for interchangeability by its symmetrical design as is best seen in Figs. 12 and 13. As an added feature, each of the crank arms 82 and 83 includes rigidly attached arms 113 and 114 which pivotally support groove bushings 115 and 116 at their free ends and the arms 113 and 114 rotate bodily about the axial center of crank shaft 81 and directly with the crank arms 82 and 83.

As seen in Fig. 12, each of the bushings 115 and 116 receive the pivotally connected rod ends 117 and 118 of the spring units 119 and 120 and the latter terminate with rod ends 121 and 122 which are pivotally connected to holding brackets 123 and 124 secured to the main frame 125 of the vehicle.

As seen in Fig. 12, with the crank arms in the particular position illustrated, spring 119 as it appears is in energized condition when the bushing 115 is in its extremely forward position. At the same time that this relationship prevails, the spring 120 is de-energized due to the bushing 116 being located in its extreme rearward position. During the operation of the vehicle, these springs will act in cooperation with each pedal to carry the same past the upper operating position of the pedal and over the dead center relationship that is created between the respective connecting rods pivotally attached to the pedals and pivotally connected to the crank arms. With this construction, the operator is aided in manipulating the device so that the pedal mechanisms are urged over dead center by reason of the introduction of the springs described.

Having thus described our invention we now claim as new:

1. A foot operated mechanism to propel a wheeled vehicle comprising at least one foot pedal, a crank mechanism, drive means interposed between said crank mechanism and at least one of the vehicle wheels, operable means connecting said pedal with said crank mechanism to actuate the latter, and guide means carried by said vehicle and connected with said pedal to confine the movements of said pedal to a predetermined straight line motion when propelling said vehicle, said guide means comprising spaced guide tubes carried by said pedal, and tubular sockets on said vehicle arranged to slidably receive said guide tubes therethrough.

2. A foot operated mechanism to propel a wheeled vehicle comprising at least one foot pedal, a crank mechanism, drive means interposed between said crank mechanism and at least one of the vehicle wheels, operable means connecting said pedal with said crank mechanism to actuate the latter, and guide means carried by said vehicle and connected with said pedal to confine the movements of said pedal to a predetermined straight line motion when propelling said vehicle, said guide means comprising spaced guide tubes carried by said pedal, and tubular sockets on said vehicle arranged to slidably receive said guide tubes therethrough, said drive mechanism including an overrunning clutch arranged for driving the vehicle forwardly and for coasting.

3. A mechanism to operate a wheeled vehicle comprising a drive transmitting mechanism connected to rotate at least one wheel of said vehicle, and a pedal operated crank shaft to motivate said drive transmitting mechanism comprising at least one reciprocable foot pedal disposed adjacent said crank shaft, an operating arm on said pedal connected with said crank shaft, and guide means to maintain said pedal in predetermined bodily operative relation with respect to said crank shaft and to guide said pedal along a given path of operation comprising guide rods rigidly secured at spaced points on said pedal, and a mounting structure having sockets therein to slidably receive said pedal guide rods therethrough.

4. In a vehicle of the class described, a platform having depending flanges thereon, an axle, and means for journalling said axle in predetermined relation below said platform and concealed between said flanges, the ends of said axle projecting through and beyond said flanges, platform supporting wheels secured to the ends of said axle, and a swivel bearing mounted upon the forward end of said platform with a platform supporting wheel journalled in said swivel bearing, axle actuating mechanism connected for driving said axle, said actuating mechanism being concealed beneath said platform and between said flanges, and drive means for said axle actuating mechanism comprising push pedals mounted for vertical reciprocation and operation above said platform, fore and aft guide rods for each pedal, spaced guide means for said rods carried by said platform, and operative drive transmitting structure connected with each pedal and between the guide rods thereof and arranged to extend through said platform for operative driving connection with said axle actuating mechanism concealed beneath said platform.

References Cited in the file of this patent

UNITED STATES PATENTS

| | | |
|---|---|---|
| 138,897 | Kimball | May 13, 1873 |
| 267,638 | Wright | Nov. 14, 1882 |
| 354,055 | Goodell | Dec. 7, 1886 |
| 586,367 | Prager | July 13, 1897 |
| 651,316 | Smith et al. | June 5, 1900 |
| 1,647,494 | Zanellato | Nov. 1, 1927 |
| 1,690,342 | Madsen | Nov. 6, 1928 |
| 2,031,015 | Stevenson | Feb. 18, 1936 |
| 2,086,445 | Smith | July 6, 1937 |
| 2,251,005 | Rubinich | July 29, 1941 |
| 2,536,569 | Purkey | Jan. 2, 1951 |

FOREIGN PATENTS

| | | |
|---|---|---|
| 20,964 | Great Britain | of 1900 |
| 65,327 | Norway | Oct. 12, 1942 |
| 604,821 | France | Feb. 6, 1926 |